United States Patent
Sugizaki et al.

(10) Patent No.: US 7,787,732 B2
(45) Date of Patent: Aug. 31, 2010

(54) OPTICAL FIBER AND OPTICAL FIBER RIBBON, AND OPTICAL INTERCONNECTION SYSTEM

(75) Inventors: Ryuichi Sugizaki, Tokyo (JP); Iwao Shimotakahara, Tokyo (JP); Harumi Inaba, Tokyo (JP); Takeshi Yagi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/180,788

(22) Filed: Jul. 28, 2008

(65) Prior Publication Data

US 2009/0086770 A1    Apr. 2, 2009

Related U.S. Application Data

(63) Continuation of application No. PCT/JP2007/067057, filed on Aug. 31, 2007.

(30) Foreign Application Priority Data

Aug. 31, 2006   (JP)   ............................. 2006-236202

(51) Int. Cl.
    *G02B 6/02*   (2006.01)
(52) U.S. Cl. .................. 385/126; 385/123; 385/124; 385/127; 385/128
(58) Field of Classification Search .............. 385/126
    See application file for complete search history.

(56) References Cited

U.S. PATENT DOCUMENTS

| | | | | |
|---|---|---|---|---|
| 7,046,885 B2* | 5/2006 | Sugizaki et al. | ............. | 385/123 |
| 7,099,545 B2* | 8/2006 | Sako et al. | ................... | 385/123 |
| 7,116,872 B2* | 10/2006 | Okuno et al. | ............... | 385/114 |
| 7,126,748 B2* | 10/2006 | Sugizaki et al. | ............. | 359/334 |
| 7,295,741 B2* | 11/2007 | Sako et al. | ................... | 385/127 |
| 7,366,386 B2* | 4/2008 | Sako et al. | ................... | 385/123 |
| 7,440,167 B2* | 10/2008 | Taniguchi et al. | ........... | 359/334 |
| 2006/0034575 A1* | 2/2006 | Sako et al. | ................... | 385/127 |
| 2006/0093297 A1* | 5/2006 | Sako et al. | ................... | 385/126 |
| 2008/0226241 A1 | 9/2008 | Sugizaki et al. | | |

FOREIGN PATENT DOCUMENTS

| | | | |
|---|---|---|---|
| JP | 01-295207 A | | 11/1989 |
| JP | 2001-278641 A | | 10/2001 |
| JP | 2005-057705 A | | 3/2005 |
| JP | 2006-126414 A | | 5/2006 |
| JP | 2007-033466 A | | 2/2007 |

OTHER PUBLICATIONS

F. Koyama, et al., "1.2 μm highly strained GaInAs/GaAs quantum well lasers for singlemode fibre datalink", Electronics Letters, vol. 35, No. 13, Jun. 24, 1999, pp. 1079-1081.

F. Koyama, et al., "Data Transmission Over Single-Mode Fiber by Using 1.2-μm Uncooled GaIn-As—GaAs Laser for Gb/s Local Area Network", IEEE Photonics Technology Letters, vol. 12, No. 2, Feb. 2000, pp. 125-127.

U.S. Appl. No. 11/909,162, filed Sep. 20, 2007, Sako, et al.
U.S. Appl. No. 12/192,169, filed Aug. 15, 2008, Sugizaki, et al.

* cited by examiner

*Primary Examiner*—Ryan Lepisto
(74) *Attorney, Agent, or Firm*—Oblon, Spivak, McClelland, Maier & Neustadt, L.L.P.

(57) ABSTRACT

An optical fiber, made of silica-based glass, comprising a core and a cladding, each of the optical fiber having a mode field diameter of 5.5 μm or larger at a wavelength of 1100 nm, transmitting light with a wavelength of 1250 nm in a single mode, and having a bending loss of 1 dB/turn or smaller at a wavelength of 1100 nm when the optical fiber is bent with a curvature radius of 2 mm.

8 Claims, 5 Drawing Sheets

FIG.3

| NUMBER | Δ1 [%] | α1 | Δ2 [%] | Δ3 [%] | a [μm] | b [μm] | c [μm] | MFD [μm] (1100 nm) | CUT-OFF WAVELENGTH [nm] | BENDING LOSS [dB/TURN] (1100 nm) |
|---|---|---|---|---|---|---|---|---|---|---|
| A | 0.60 | 9 | -0.2 | - | 6.7 | 18.7 | - | 5.7 | 1079 | 0.6 |
| B | 0.75 | step | - | - | 4.7 | - | - | 5.1 | 1079 | 1.0 |
| C | 0.70 | 2 | -0.4 | 0.2 | 8.0 | 20.0 | 24.0 | 5.5 | 1074 | 0.6 |
| D | 0.60 | 9 | 0.0 | -0.2 | 6.2 | 9.6 | 20.8 | 5.8 | 1062 | 0.5 |
| A1 | 0.60 | step | -0.40 | - | 6.5 | 13.0 | - | 5.6 | 1093 | 0.8 |
| A2 | 0.55 | step | -0.40 | - | 7.3 | 14.0 | - | 6.1 | 1171 | 0.7 |
| A3 | 0.75 | 2 | -0.40 | - | 7.9 | 15.8 | - | 5.5 | 1072 | 0.9 |
| A4 | 0.70 | 3 | -0.20 | - | 7.3 | 21.9 | - | 5.6 | 1080 | 0.9 |
| A5 | 0.70 | step | -0.01 | - | 4.9 | 19.6 | - | 5.3 | 1078 | 0.9 |
| A6 | 0.65 | step | -0.02 | - | 5.3 | 13.1 | - | 5.6 | 1098 | 0.8 |
| A7 | 0.65 | 4 | -0.40 | - | 7.3 | 14.5 | - | 5.6 | 1061 | 0.7 |
| A8 | 0.70 | 2 | -0.40 | - | 8.3 | 16.5 | - | 5.7 | 1080 | 0.7 |
| A9 | 0.85 | 1 | -0.40 | - | 9.4 | 18.8 | - | 5.8 | 1095 | 0.7 |
| A10 | 0.90 | 1 | -0.40 | - | 8.8 | 17.6 | - | 5.6 | 1059 | 0.7 |

OPTICAL FIBER AND OPTICAL FIBER RIBBON, AND OPTICAL INTERCONNECTION SYSTEM

CROSS-REFERENCE TO RELATED APPLICATIONS

This application is a continuation of PCT/JP2007/067057 filed on Aug. 31, 2007, the entire content of which are incorporated herein by reference.

BACKGROUND OF THE INVENTION

1. Field of the Invention

The present invention relates to an optical fiber and an optical fiber ribbon.

2. Description of the Related Art

Schemes used for signal transmission inside an apparatus can be two types: electric transmission scheme and optical interconnection scheme. With the recent increase of the speed of CPU clock frequencies, occurrence of cross-talk, which is caused by high density wiring, is a problem for the electric transmission scheme. Therefore, application of a waveform shaping technique, etc., is necessary. As a result, when the electric scheme is employed as the signal transmission scheme in an apparatus, it is known that a transmission distance of about 100 m and a transmission speed of about 10 Gbps are the limits for the transmission. On the other hand, the optical interconnection scheme enables execution of transmission over a much broader band compared to the electric transmission scheme and also enables configuration of a signal transmission system that uses small-size low-power-consumption optical components. Therefore, the optical interconnection scheme is drawing attention as an in-apparatus signal transmission technique that is to replace the electric transmission scheme.

The optical interconnection scheme includes a scheme that uses optical waveguide circuits as an optical transmission unit and a scheme that uses optical fibers. Because it is desirable that all optical components used in an apparatus can be accommodated saving as much space as possible, an optical fiber that enables flexible wiring and that enables small-loss optical transmission is positioned as one of the optical components that are suitable for the optical interconnection.

Conventionally, a multi-mode optical fiber (MMF) has been used as an optical fiber for short-distance optical transmission. Normally, an MMF has a core diameter that is 10 times as large as that of a single-mode fiber (SMF), so that the MMF needs no high precision for connection between the optical fiber and a light source because of the magnitude of the numerical aperture thereof. Therefore, the MMF enables easy connection. Especially, an approach is often used that employs a Vertical-Cavity Surface-Emitting Laser, hereinafter, "VCSEL" of an oscillation wavelength of 850 nm as a light source and employs a graded-index optical fiber that is a type of multi-mode optical fiber as an optical transmission medium. A graded-index optical fiber is an optical fiber that suppresses the influence of mode dispersion by optimizing the refractive index profile shape in a core region. A graded-index optical fiber of which the refractive index profile shape is precisely controlled enables high-speed optical communication at a transmission speed of 10 Gbps and connecting a distance of about 100 m. However, aiming at performing longer-distance transmission or higher-speed transmission, consideration of application of a SMF which generally has wider bandwidth is being started. Recently, research of a GaInAs/GaAs-based semiconductor laser as a light source applied in such a case is being proceeded. This laser is characterized in that the laser has an oscillation wavelength of 1,100 nm to 1,200 nm, has a low oscillation threshold value, has an excellent temperature property, and may directly modulate at 10 Gbps, etc. Therefore, the laser is drawing attention as a light source to be used in a LAN, etc. The oscillation wavelength thereof can be varied and research and development thereof for both of 1,100 nm and 1,200 nm have been carried out so far and presentations in academic societies thereon are performed. For example, Non-Patent Document 1 and Non-Patent Document 2 disclose that transmission is executed through an SMF using a GaInAs/GaAs quantum well laser as a light source. When an SMF is used, high-speed optical communication at a transmission speed of about 40 Gbps is enabled.

Non-Patent Document 1: F. Koyama et al., "1.2 μm highly strained GaInAs/GaAs quantum well laser for singlemode fibre datalink", ELECTRONICS LETTERS, Vol. 35, No. 13, pp. 1079-1081, June, 1999.

Non Patent Document 2: F Koyama et al., "Data Transmission Over Single-Mode Fiber by Using 1.2-μm Uncooled GaInAs/GaAs Laser for Gb/s Local Area Network", PHOTONICS TECHNOLOGY LETTERS, Vol. 12, No. 2, pp. 125-127, February, 2000.

As above, a demand exists for realization of an optical fiber of which the bending loss and the connection loss are both reduced, that enables high-speed optical transmission, and that is suitable for easily constructing an optical interconnection system. A demand also exists for realization of an optical fiber that can be run at a small bending radius, of which the break probability due to bending is small, and of which extra length can be accommodated.

SUMMARY OF THE INVENTION

It is an object of the present invention to at least partially solve the problems in the conventional technology.

According to an aspect of the present invention, there is provided an optical fiber, made of silica-based glass, comprising a core and a cladding, the optical fiber having a mode field diameter of 5.5 μm or larger at a wavelength of 1100 nm, transmitting light with a wavelength of 1250 nm in a single mode, and having a bending loss of 1 dB/turn or smaller at a wavelength of 1100 nm when the optical fiber is bent with a curvature radius of 2 mm.

According to another aspect of the present invention, there is provided an optical fiber ribbon wherein the optical fiber ribbon is formed by placing a plurality of optical fibers side by side and in parallel to each other and mutually joining the optical fibers, in each of the optical fibers, made of silica-based glass, comprising a core and a cladding, each of the optical fibers having a mode field diameter of 5.5 μm or larger at a wavelength of 1100 nm, transmitting light with a wavelength of 1250 nm in a single mode, and having a bending loss of 1 dB/turn or smaller at a wavelength of 1100 nm when the optical fiber is bent with a curvature radius of 2 mm.

According to still another aspect of the present invention, there is provided an optical interconnection system including a light source comprising a surface emitting semiconductor laser that has an oscillation wavelength of 1,100 nm to 1,200 nm; and a transmission medium comprising an optical fiber, wherein the optical fiber, made of silica-based glass, comprising a core and a cladding, the optical fiber having a mode field diameter of 5.5 μm or larger at a wavelength of 1100 nm, transmitting light with a wavelength of 1250 nm in a single mode, and having a bending loss of 1 dB/turn or smaller at a wavelength of 1100 nm when the optical fiber is bent with a curvature radius of 2 mm.

According to still another aspect of the present invention, there is provided an optical interconnection system including a light source comprising a surface emitting semiconductor laser that has an oscillation wavelength of 1,100 nm to 1,200 nm; and a transmission medium comprising an optical fiber ribbon that is formed by placing a plurality of optical fibers side by side and in parallel to each other and mutually joining the optical fibers, in each of the optical fibers, made of silica-based glass, comprising a core and a cladding, each of the optical fibers having a mode field diameter of 5.5 μm or larger at a wavelength of 1100 nm, transmitting light with a wavelength of 1250 nm in a single mode, and having a bending loss of 1 dB/turn or smaller at a wavelength of 1100 nm when the optical fiber is bent with a curvature radius of 2 mm.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a chart of a characteristics list for optical fibers respectively having refractive index profiles shown in FIGS. 2 and 4 to 6 when each parameter is set for the fibers;

DETAILED DESCRIPTION OF THE PREFERRED EMBODIMENTS

Exemplary embodiments of an optical fiber according to the present invention are explained below. The present invention is not limited to the embodiment. An optical fiber according to an embodiment of the present invention enables high-speed optical transmission that exhibits a small loss over a wavelength range of 1,100 μm to 1,200 μm by single-mode operation at a wavelength of 1,100 nm. A mode field diameter of the optical fiber for a wavelength of 1,100 nm is 5.5 μm or larger and, thereby, a connection loss generated between optical fibers can be reduced and construction of an optical interconnection system is facilitated. Simultaneously, a bending loss for the wavelength of 1,100 nm generated when the optical fiber is bent at a radius of curvature of 2 mm is 1 dB/turn and, thereby, flexible wiring and compact accommodation of the optical fiber are enabled. Specific description will be given below.

The core diameter of an SMF is usually about 5 μm to 10 μm and this core diameter is very small compared to that of an MMF that has a core diameter of about 50 μm to 62.5 μm. Therefore, an SMF needs high precision connection between the optical fiber and a light source, etc. When an in-apparatus communication system is constructed using optical interconnection, it is assumed that optical components such as an optical fiber and a VCSEL are connected by spatial coupling that uses a connector, etc., at about five points. When optical components are connected by spatial coupling, an optical axial misalignment is generated between the components connected and, thereby, a connection loss is generated. Therefore, even when the mode field diameter (MFD) of the components is almost same, the connection loss is induced by the axial misalignment. Reduction of the connection efficiency due to an axial misalignment tends to be more remarkable and the connection loss with an axial misalignment tends to be larger as the MFD difference between components connected becomes larger.

Figure 1:
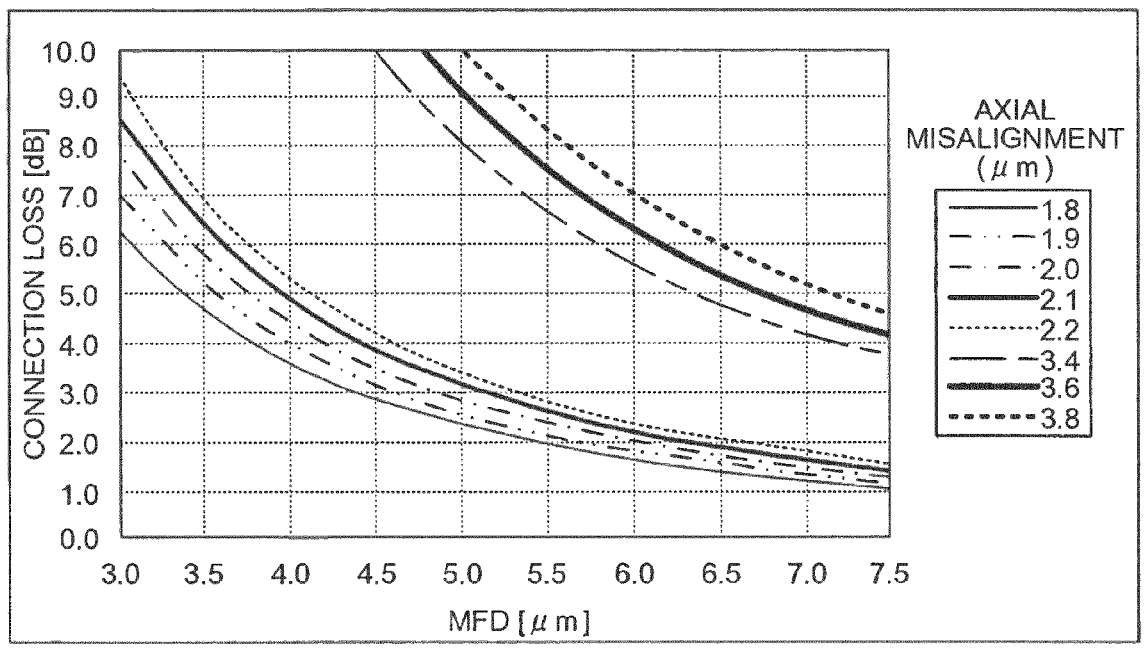
FIG. 1 is a diagram of the result of calculation of the relation between an MFD for an axial misalignment and a connection loss, in connection between the same types of SMF.

For example, the result of calculation of the relation between an MFD and a connection loss for each axial misalignment is shown in FIG. 1. An axial misalignment is an important parameter for reducing a connection loss between an optical fiber and a light source, an optical fiber and a light-receiving unit, or optical fibers. At present, the maximum of the axial misalignment due to an error caused during the manufacture can be about 2 μm taking into account multi-conductor collective connection using a multi-conductor connector or an optical fiber ribbon. Therefore, loss designing considering that an axial misalignment of 2 μm can be admitted is necessary from the viewpoint of the worst-case designing.

Referring to FIG. 1, for the axial misalignment of 2 μm, a connection loss of about 2.2 dB is generated when the MFD is 5.5 μm. When it is assumed that five connecting points are present between a VCSEL that is a light source and a light-receiving unit and an axial misalignment at each connecting point is 2 μm, a connection loss of at largest 11 dB caused by the axial misalignments is generated. When it is assumed that a typical optical interconnection system that includes a VCSEL having an output optical power of −3 dBm, a light-receiving unit having a receiving sensitivity of −16 dBm, and an optical fiber having a length of about 50 cm is constructed, the dynamic range of this system is about 13 dB because the transmission loss generated by portions other than bent portions of the optical fiber is small that is 0.01 dB or smaller. However, in practice, not only the loss of 11 dB generated by the above axial misalignment but also a connection loss generated by an angular gap is generated at each connecting point and, therefore, substantially no margin is present against the dynamic range of 13 dB of the system in the case of the above assumption. On the other hand, as shown in FIG. 1, when the amount of the axial misalignment is same, the connection loss increases as the MFD decreases. Therefore, it is difficult to construct the above optical interconnection system by applying an SMF having an MFD of about 5.5 μm or smaller.

When a quartz-based optical fiber is used for in-apparatus optical wiring, it is required that the optical fiber enables flexible wiring and that it can be compactly accommodated. On the other hand, when construction of a high-speed optical interconnection system is the object, it is desirable that the transmission loss of the optical fiber is close to zero as much as possible. That is, it is desired that no bending loss occurs to an optical fiber for optical interconnection even when the optical fiber is bent with a very small radius of curvature due to wiring constrains. In actual in-apparatus optical wiring, it is possible that an optical fiber is bent at a radius of curvature of about 2 mm at several points. When the cases are considered where local bending due to running of an optical fiber for wiring is applied thereto or where a bending loss has exceeded a bending loss permissive value that is necessary from the viewpoint of the worst-case designing, if one turn of bending at a radius of curvature of 2 mm is applied in those cases, a bending loss of 1 dB or less can be said to be a fully excellent bending loss property and to enable flexible optical wiring. Herein, "turn" is used for counting bending-formed portions (bent portions) and, when an optical fiber is bent by 360 degrees, this bending is counted as one turn. For example, this term is used as in "four 90-degree bent portions make one turn" and "two 90-degree bent portions make ½ turn".

For example, for an ordinary SMF, when bending of one turn at a radius of curvature of 5 mm is applied thereto, a bending loss of about 30 dB is generated at a wavelength of 1,550 nm. When bending of one turn at a radius of curvature of 2 mm is applied, a bending loss of 60 dB or larger is generated. For example, in the above system having the dynamic range of 13 dB, a margin of the increase of the loss caused by the bending loss is only 2 dB and a very small bending loss of about 1 dB or less per turn is demanded taking into account a wiring state where local bending of two turns at a radius of curvature of 2 mm is generated due to the running of the optical fiber. Therefore, no ordinary SMF can be applied to the construction of the system. For an SMF having an ordinary single-peak refractive index profile, suppression of a bending loss and extension of the MFD are in a trading-off relation and, therefore, the bending loss and the connection loss cannot simultaneously be improved.

When an in-apparatus optical wiring form is assumed, it is demanded to compactly accommodate the wiring and it may be considered that small bending at a small radius of curvature of a bending radius of about 5 mm is applied at various points in an apparatus due to deformation, etc., of the wiring between chips in addition to the above bending at the bending radius of about 2 mm. For each of the points at which bending at a bending radius of about 2 mm is applied, heat treatment, etc., are applied and measures to release the strain are taken. However, no such measures are taken for the bending at a bending radius of about 5 mm that occurs at various points in the apparatus. Therefore, it is worried that the optical fiber is broken by the stress strain generated at each bent portion at each point at which bending at a bending radius of 5 mm is applied to the optical fiber. Therefore, the probability of break due to bending needs to be reduced.

Generally, distortion generated when an optical fiber is bent becomes larger and the break probability becomes higher as the cladding diameter becomes larger. For example, when an optical interconnection system is constructed using an optical fiber, it is assumed that bending by an angle of 90 degrees at a radius of curvature of about 5 mm is applied to the optical fiber at about 20 points. Assuming that the screening level is 2%, the fatigue factor between the optical fiber and a coating material is 22, and the product life is five years, the failure rate is 5.5 when the cladding diameter of the optical fiber is 125 μm. However, the failure factor obtained when the cladding diameter of the optical fiber is reduced to 90 μm is 0.04 and can be reduced to about 0.7% of that for 125 μm. For system designing, it is preferable that the failure rate is 0.05 or less. For an ordinary optical fiber, the demand for reducing the probability of break thereof due to bending is not so strong. However, when the optical fiber is bent at a small radius as in an optical interconnection system, an effect obtained by reducing the probability of break due to the above small-radius winding is significant.

On the other hand, generally, for an SMF, it is said that a cladding diameter that is about ten times as large as the MFD or smaller influences the losses thereof. Therefore, for an optical fiber for the present use that needs an MFD of 5.5 μm or larger, no increase of the transmission loss caused by reducing the cladding diameter occurs when the cladding diameter is 55 μm or larger.

Figure 2:
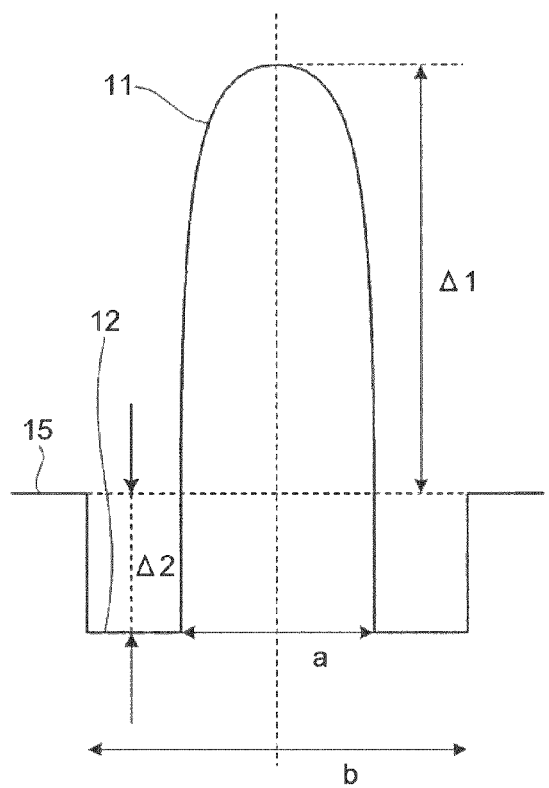
FIG. 2 is a diagram of a W-shaped refractive index profile used for simulation of characteristics of an optical fiber according to an embodiment of the present invention.

More detailed description will be given below for the optical fiber of the embodiment referring to the simulation result. Characteristics are obtained using simulation, of optical fibers of the embodiment formed of quartz-based glass and having a W-shaped refractive index profile as shown in FIG. 2. In each of the optical fibers a first core having a diameter of "a" and doped with germanium is provided in a first layer; and a second core having an outer diameter of b and doped with fluorine, that is a depressed layer is provided in a second layer. In FIG. 2, a reference numeral "11" denotes a refractive index profile of the first core; a reference numeral "12" denotes a refractive index profile of the second core; and a reference numeral "15" denotes a refractive index profile of a cladding. Detailed designed values of parameters that indicate each of the refractive index profiles and calculated optical fiber characteristics are shown being denoted by A of FIG. 3. In FIG. 3, α1 is an α value representing the shape of a refractive index profile of the first core and is defined by α in Equation (1):

$$n^2(r) = n_{c1}^2 \{1 - 2 \cdot (\Delta 1/100) \cdot (2r/a)^\alpha\} \quad (1)$$

where $0 < r < a/2$.

In Equation (1), "r" represents the position in the radial direction from the center of the optical fiber, "n(r)" represents a refractive index at the position r, "$n_{c1}$" is the maximum refractive index of the first core, "a" is the diameter of the first core, and "^" is a symbol that represents the power.

"Δ1" and "Δ2" respectively represents the relative refractive index difference of the first core against the cladding and the relative refractive index of the second core against the cladding, and are respectively expressed by Equations (2) and (3):

$$\Delta 1 = \{(n_{c1} - n_c)/n_{c1}\} 100 \quad (2)$$

$$\Delta 2 = \{(n_{c2} - n_c)/n_{c2}\} \cdot 100 \quad (3)$$

In Equations (2) and (3), $n_{c1}$ is the maximum refractive index of the first core; $n_{c2}$ is the minimum refractive index of the second core; and $n_c$ is the refractive index of the cladding.

An optical fiber denoted by "A" has an MFD of 5.7 μm at a wavelength of 1,100 nm, and operate in the single mode at the same wavelength. The bending loss thereof at a bending radius of 2 mm at the same wavelength is 0.6 dB/turn. For optical fibers each having a W-shaped refractive index profile shown in FIG. 2, the simulation results of the characteristics obtained when each parameter value is varied are shown being denoted by A1 to A10 of FIG. 3. For the optical fibers of which the α value of the first core is sufficiently large and the shape of the first core can be regarded as being step type, α1 is described as "step" in FIG. 3. Of the optical fibers denoted by A and A1 to A10 of FIG. 3, those that each have the MFD of 5.5 μm or larger at a wavelength of 1,100 nm, that enable transmission in the single mode at a wavelength of 1,100 nm, and that each have a bending loss of 1 dB/turn or less at a wavelength of 1,100 nm when those are bent at a radius of 2 mm, are A, A1, A3, A4, and A6 to A10. Therefore, based on these simulation results, it is known that, for the optical fibers each having the W-shaped refractive index profile show in FIG. 2, an optical fiber of the embodiment that has the desired characteristics can be obtained by setting, in the core refractive index profile, the relative refractive index difference (Δ1) of the first core to be 0.6% or larger; and the relative refractive index difference (Δ2) of the second core to be −0.02% or smaller. Especially, the relative refractive index difference (Δ2) of the second core may preferably be set to be −0.05% or smaller. That is, the refractive index of the second core only has to slightly be decreased against the refractive index of the cladding and, therefore, the degrees of freedom in designing the refractive index profile becomes high and the manufacturability also becomes high.

Figure 4:
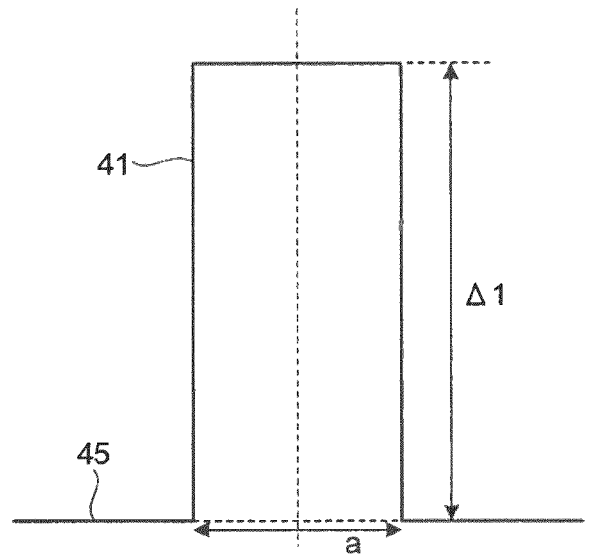
FIG. 4 is a diagram of a single-peak refractive index profile used for simulation of characteristics of a conventional optical fiber.

To compare with the above optical fiber according to the embodiment, characteristics are obtained using simulation, of optical fibers that each have a single-peak refractive index profile, that each have a core diameter of "a" as shown in FIG. 4, and that each have a low bending loss property to show a bending loss of 1.0 dB/turn at a bending radius of 2 mm at a wavelength of 1,100 nm. In FIG. 4, a numeral "41" denotes a refractive index profile of the core and a numeral "45" denotes a refractive index profile of the cladding. The calculated characteristics are shown being denoted by "B" of FIG. 3. For the optical fiber denoted by "B", the MFD at a wavelength of 1,100 nm is 5.1 μm. In this case, referring to FIG. 1, when the axial misalignment is 2 μm, the connection loss is very large that is 2.7 dB and, therefore, both of the bending loss and the connection loss are not always simultaneously reduced.

Figure 5:
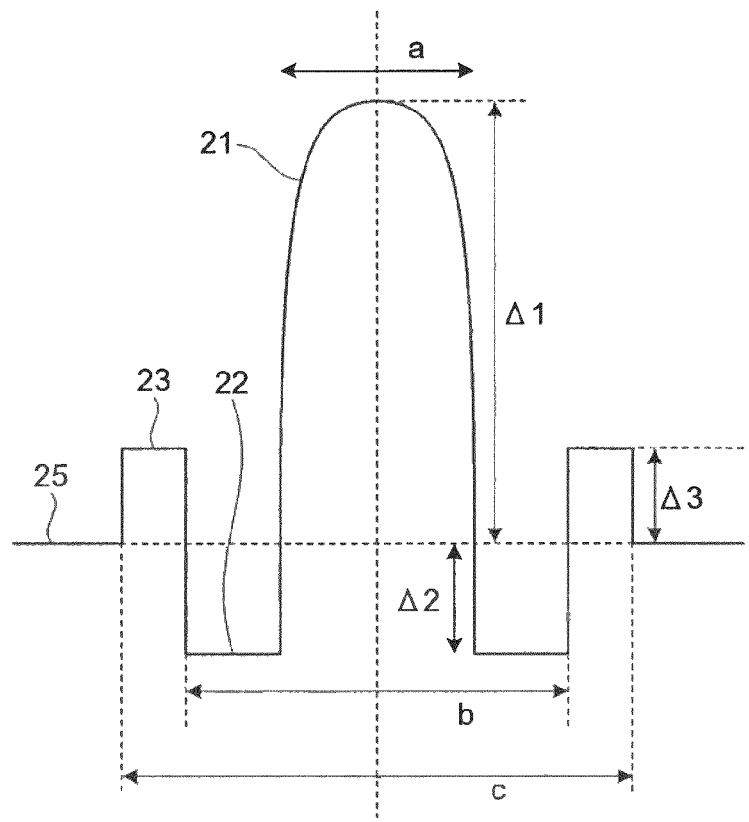
FIG. 5 is a diagram of a W-segment refractive index profile used for simulation of characteristics of the optical fiber according to the embodiment.

Characteristics are obtained using simulation, of optical fibers that each are formed of quartz-based glass and that each have a W-segment refractive index profile shown in FIG. 5. For these optical fibers a first core that has a diameter of "a" and that is doped with germanium is provided in a first layer; a second core that has an outer diameter of b, that is doped with fluorine, and that is a depressed layer is provided in a second layer; and a third core that has an outer diameter of c, that is doped with germanium, and that is a segment layer is provided in a third layer. In FIG. 5, a numeral 21 denotes a refractive index profile of the first core; a numeral 22 denotes a refractive index profile of the second core; a numeral 23 denotes a refractive index profile of the third core; and a numeral 25 denotes a refractive index profile of the cladding. Detailed designed values of parameters that indicate each of the refractive index profiles and calculated optical fiber characteristics are shown being denoted by C of FIG. 3. "Δ3" is the relative refractive index difference of the third core against the cladding and is expressed by Equation (4):

$$\Delta 3 = \{(n_{c3} - n_c)/n_{c3}\} \cdot 100[\%] \quad (4)$$

In Equation (4), $n_{c3}$ is the maximum refractive index of the third core in the W-segment refractive index profile.

The optical fiber denoted by C has an MFD of 5.5 μm at a wavelength of 1,100 nm, operates in the single mode at the same wavelength, and has a bending loss of 0.6 dB/turn at a bending radius of 2 mm at the same wavelength. As a result, it is known that an optical fiber that has the desired characteristics can be obtained using the optical fiber that has the W-segment refractive index profile.

Figure 6:
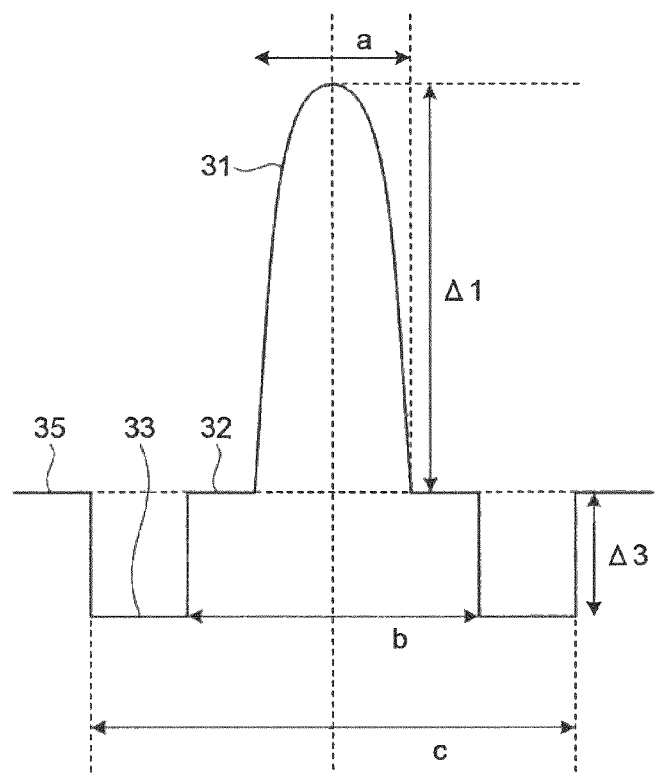
FIG. 6 is a diagram of a quasi-W-shaped refractive index profile used for simulation of characteristics of the optical fiber according to the embodiment.

Characteristics are obtained using simulation, of optical fibers of the embodiment formed of quartz-based glass and having a quasi-W-shaped refractive index profile as shown in FIG. 6. In each of the optical fibers a first core having a diameter of "a" and doped with germanium is provided in a first layer; a second core having an outer diameter of b and doped with fluorine, that is a silica layer is provided in a second layer; and a third core having an outer diameter of c and doped with fluorine, that is a depressed layer is provided in a third layer. In FIG. 6, a reference numeral "31" denotes a refractive index profile of the first core; a reference numeral "32" denotes a refractive index profile of the second core; a reference numeral "33" denotes a refractive index profile of the third core, and a reference numeral "35" denotes a refractive index profile of a cladding. Detailed designed values of parameters that indicate each of the refractive index profiles and calculated characteristics are shown being denoted by A of FIG. 3. Similarly to the above, "Δ3" is the relative refractive index difference of the third core against the cladding and is expressed in Equation (4). In this case, $n_{c3}$ in Equation (4) is the minimum refractive index of the third core in the quasi-W-shaped refractive index profile.

The optical fiber denoted by D has an MFD of 5.8 μm at a wavelength of 1,100 nm, operates in the single mode at the same wavelength, and has a bending loss of 0.5 dB/turn at a bending radius of 2 mm at the same wavelength. As a result, it is known that an optical fiber that has the desired characteristics can be obtained by setting each parameter, also using the optical fiber that has the W-segment refractive index profile.

As above, for SMFs that have the single-peak refractive index profile shown in FIG. 4, those optical fibers that have the substantially same MFD show the substantially same bending loss depending substantially on no core shape when the cut-off wavelength thereof is determined by varying the core diameter thereof. However, for the W-shaped refractive index profile obtained by providing a depressed layer as the second core around the outer circumference of the first core shown in FIG. 2, the MFD can be varied maintaining a bending loss and a cut-off wavelength that are same as those of the single-peak refractive index profile. This is because the cut-off wavelength is not shifted to a longer wavelength by increasing the relative refractive index difference (Δ) of the central core when the depressed layer is provided and, therefore, the core diameter does not need to be reduced for adjusting the cut-off wavelength. As shown in FIGS. 5 and 6, when the depressed layers are provided as the second and the third cores, the shape of the first core significantly influences the MFD. The optical confinement effect becomes weaker and the MFD becomes larger as the α value that represents the shape of the first core refractive index profile becomes smaller. On the other hand, the MFD is not influenced by the magnitude or the layer width of the Δ of the depressed layer.

Description will be given about an optical fiber ribbon and an optical interconnection system according to another embodiment of the present invention. When optical fibers are used for optical interconnection, it is assumed that the optical fibers are made in the form of a ribbon and, thereby, an optical transmission body is caused to have multiple channels and high-speed optical communication is executed. Usually, according to the specification of a quartz-based optical fiber, it is general that an outer diameter after coating is 250 μm against a cladding diameter of 125 μm and the pitch of an optical fiber ribbon formed by mutually joining a plurality of optical fibers placed in parallel to each other is 250 μm. For a small-diameter optical fiber for which the outer diameter of the optical fiber is reduced, the outer diameter after coating is also a small diameter and, therefore, manufacture of an optical fiber ribbon having a narrower pitch than that of a conventional optical fiber ribbon is enabled. Therefore, it is preferable to use the above small-diameter optical fiber having a cladding diameter of 55 μm to 90 μm. An optical fiber ribbon having a narrow pitch using the small-diameter optical fibers is highly flexible for wiring and can be accommodated saving space and, therefore, is an optical component that is suitable for optical interconnection.

Figure 7:
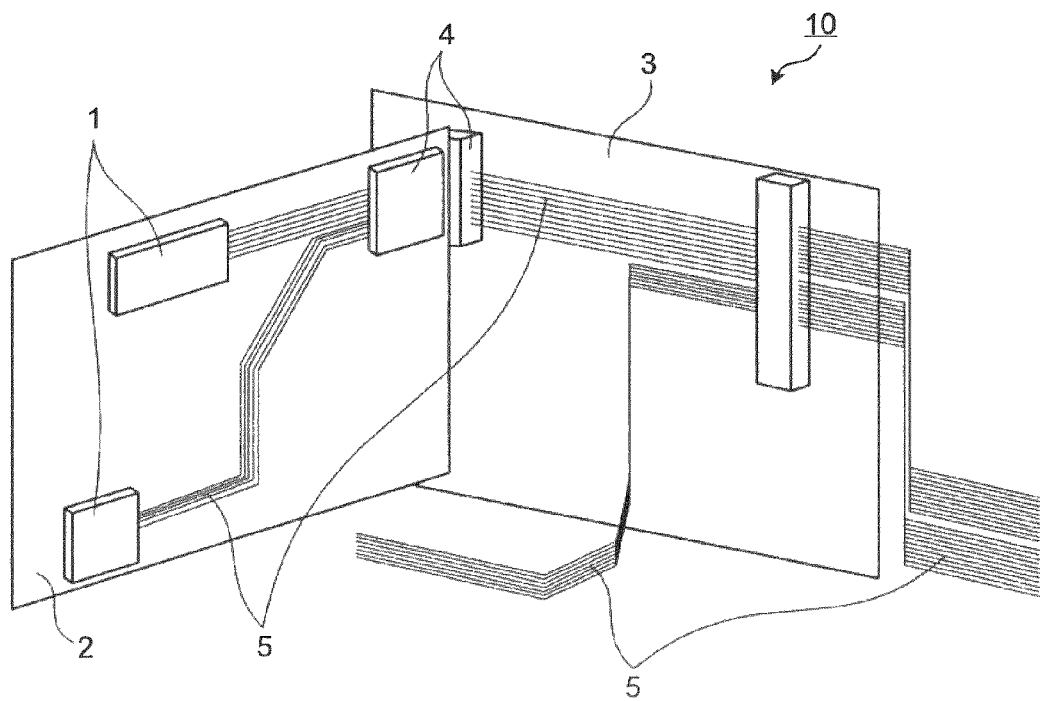
FIG. 7 is a diagram of an exemplary configuration of an optical interconnection system according to another embodiment of the present invention.

As indicated by the above calculation result, the optical fiber of the embodiment enables single-mode optical transmission at a wavelength of 1,100 nm and has the excellent bending loss property and the excellent connection loss property at the wavelength of 1,100 nm. FIG. 7 shows an exemplary configuration of an optical interconnection system that applies an optical fiber ribbon that uses the above optical fiber of the embodiment as a transmission medium and that uses a VCSEL of the oscillation wavelength of 1,100 nm as a light source. The optical interconnection system 10 shown in FIG. 7 includes a back board 3, and a printed circuit board 2 connected to the back board 3 by a connector connecting unit 4. An optical I/O 1 is mounted on the printed circuit board 2. The optical I/O 1 is connected to the connector connecting unit 4 through the above small-diameter optical fiber ribbon 5. Thereby, optical connection is established between the printed circuit board 2 and the back board 3. The small-diameter optical fiber ribbon 5 is also disposed on the back board 3 and, thereby, optical connection between the optical interconnection systems is enabled.

An optical fiber ribbon is assembled using optical fibers that each have the characteristics denoted by A of FIG. 3. Employing this optical fiber ribbon and a VCSEL having an oscillation wavelength 1,200 nm, an optical interconnection system having the same configuration as FIG. 7 was actually constructed. The output optical power of the VCSEL was −3 dBm. The reception sensitivity of a light-receiving device was −16 dBm. The dynamic range of the system (a loss margin in the sum of the bending loss and the connection loss) was 13 dB.

Figure 8:
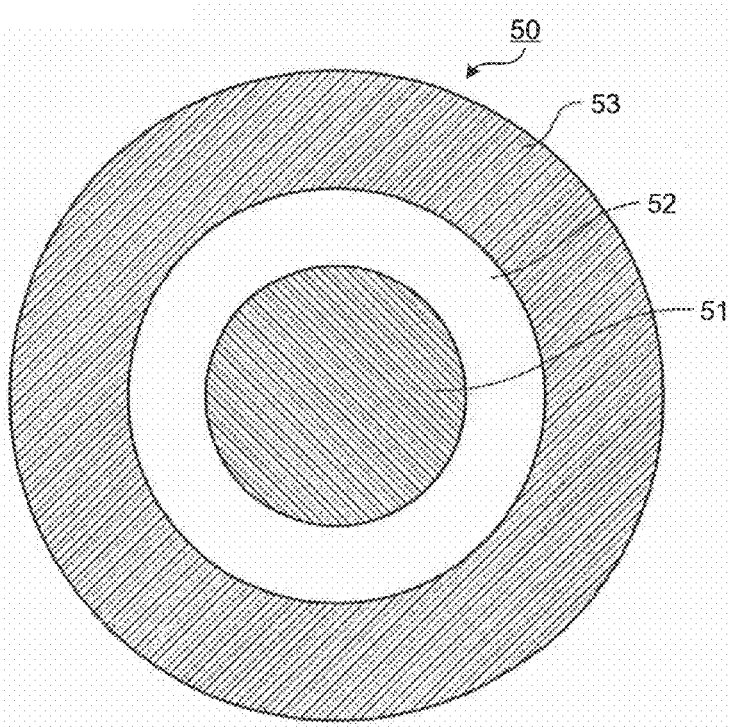
FIG. 8 is a cross-sectional view of an optical fiber that has a coating according to still another embodiment of the present invention.
Figure 9:
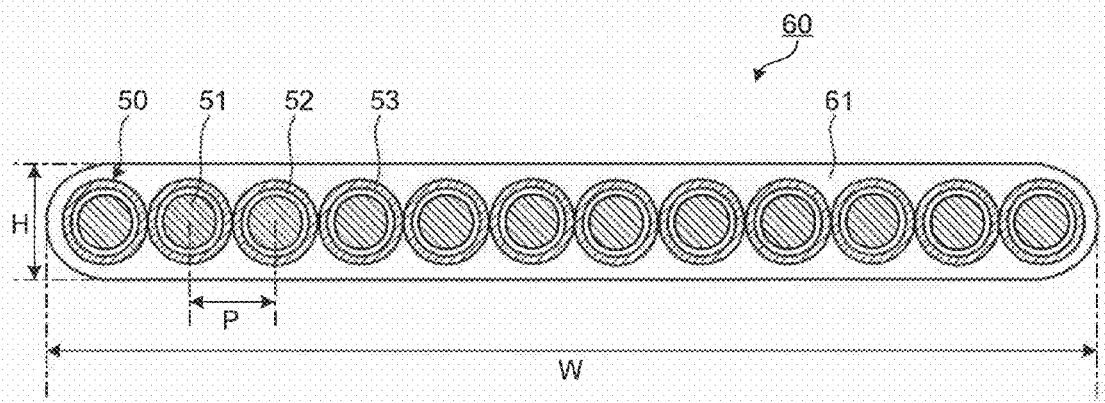
FIG. 9 is a cross-sectional view of an optical fiber ribbon according to still another embodiment of the present invention.

The optical fibers used in this case each have a coating. That is, as shown in FIG. 8, in the optical fiber 50 that has a coating, the outer diameter of an optical fiber 51, that is, the cladding diameter is 80 µm. The outer diameter of a primary coating resin 52 is 105 µm. The outer diameter of a secondary coating resin 53 is 125 µm. As shown in FIG. 9, the 12 optical fibers 50 having coatings are placed side by side and in parallel to each other at a pitch P of 125 µm. By coating this with a ribbon coating resin 61 that is a ribbon coating, these optical fibers 50 each having a coating are joined and, thereby, the small-diameter optical fiber ribbon 60 is assembled. The coating diameter H (thickness H) is set to be 170 µm taking into account both elements of an increased amount of the loss due to reduction of the thickness of the ribbon coating resin 61, and saving space. The optical fiber ribbon 60 having the pitch P that is set to be 125 µm has a half of the conventional size, is very highly flexible, and can be accommodated in an apparatus saving space. A UV-curable resin is used as the material of the ribbon coating resin 61.

The pitch P can be reduced to 75 µm when small-diameter optical fibers that each have the cladding diameter of 55 µm of the optical fiber 51 and the difference of 20 µm between the secondary coating outer diameter and the cladding outer diameter are used.

The finished dimensions of the optical fiber ribbon 60 are 1.55 mm for a width W and 0.17 mm for a thickness H. By arranging a light source VCSEL that is the connection counterpart in an array having a pitch of 125 µm and 12 channels, collective optical connection by the manufactured fiber ribbon 60 is enabled. In this structure, by directly modulating a VCSEL, ultra-high-speed optical communication exceeding 100 Gbps is realized.

Though the VCSEL having the oscillation wavelength of 1,200 nm is applied in the embodiment, it is clear for those skilled in the art that the above optical fiber according to the embodiment enables transmission in the single mode also at a wavelength of 1,100 nm and, when a VCSEL having an oscillation wavelength of 1,100 nm is applied, an optical interconnection system can also be constructed.

A flame-resisting ribbon core fiber was manufactured using a flame-resisting UV-curable urethane acrylate resin as the UV-curable resin that is the material of the coating resin 61. Giving a flame-resisting property was considered by adding to the resin a halogen-based additive such as bromine and chlorine; an antimonial compound such as antimonous oxide and triphenyl antimony; a metal hydrate such as aluminum hydroxide and magnesium hydroxide; and a phosphoric compound such as phosphate, or by halogenating with bromine or chlorine the pre-polymer or acryl-monomer itself that configures the UV-curable resin and infiltrating phosphorus therein, during the manufacture of the flame-resisting UV-curable urethane acrylate resin used in this case. Of these methods, the method of adding a bromine-based flame-resisting agent was especially effective.

It is considered that the reason why the giving of the flame-resisting property was realized by varying the composition as above is that a product generated by a decomposition reaction coats the resin surface or that a cracked gas generated during combustion forms an insulating layer between the resin and air. It also is considered that radicals from a halogen-containing compound prevents combustion from continuing or that the resin is made three-dimensional by bridging.

An optical fiber ribbon obtained using a UV-curable urethane acrylate resin that contains aluminum hydroxide as a flame-resisting agent was evaluated in a 60-degree inclined combustion test according to the JIS C3005 standard as a ribbon coating resin. As a result, flames ignited on the fibers were automatically put out in about 3.2 seconds on average and the resin could meet the standard. Though the flame-resisting UV-curable resin was used in this case, a flame-resisting thermo-plastic resin or a flame-resisting heat-curable resin may also be used instead of the flame-resisting UV-curable resin.

It was considered to obtain a high flame-resisting property by replacing the whole or a part of the coating resin of the optical fiber ribbon 60, and the ribbon coating resin with a flame-resisting UV-curable resin. As a result, with an optical fiber ribbon obtained using a UV-curable urethane acrylate resin containing a flame-resisting agent at least for the secondary coating resin of the optical fiber and the ribbon coating resin, in a 60-degree inclined combustion test according to JIS C3005 standard, flames ignited were automatically put out in about 2.6 seconds on average and this resin could meet the standard.

A vertical combustion test according to UL1581 standard was executed to the above optical fiber ribbon and, as a result, flames were automatically put out in 5.7 seconds in average. No burning drips were observed, which means that this ribbon could meet the UL standard. Similar vertical combustion test was executed to an optical fiber that was at a stage of an element wire thereof having been applied with the processes up to the secondary coating and, as a result, flames were automatically put out in 7.6 second on average and the optical fiber had a sufficient flame-resisting property in the forms of an element wire thereof and a ribbon core fiber. Though the flame-resisting UV-curable resin was used in this case, a flame-resisting thermo-plastic resin or a flame-resisting heat-curable resin may also be used instead of the flame-resisting UV-curable resin.

The embodiments provide a single mode optical fiber that has an excellent bending loss property and an excellent connection loss property for a wavelength of 1,100 nm. The embodiments also provide a system that realizes high-speed optical interconnection, and a single mode optical fiber and an optical fiber ribbon that are suitable for use in the system.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical fiber, made of silica-based glass, comprising:
   a core including a first core having a diameter "a" of 5.3 μm to 9.4 μm and a second core that surrounds the first core, the second core having a diameter "b" of 13.0 μm to 21.9 μm; and
   a cladding, the optical fiber
   having a mode field diameter of 5.5 μm or larger at a wavelength of 1100 nm, transmitting light with a wavelength of 1100 nm in a single mode, and
   having a bending loss of 1 dB/turn or smaller at a wavelength of 1100 nm when the optical fiber is bent with a curvature radius of 2 mm,
   wherein the core has a refractive index profile with a relative refractive index difference ($\Delta 1$) of the first core with respect to the cladding being 0.6% or larger, and a relative refractive index difference ($\Delta 2$) of the second core with respect to the cladding being $-0.02\%$ or smaller.

2. The optical fiber according to claim 1, wherein a diameter of the cladding is 55 μm to 90 μm.

3. The optical fiber according to claim 2, wherein
   the optical fiber has a coating formed of at least any one of a UV-curable resin, a thermo-plastic resin, and a heat-curable resin, and
   at least a portion of the UV-curable resin, the thermo-plastic resin, and the heat-curable resin has a flame-resisting property.

4. The optical fiber according to claim 1, wherein
   the optical fiber has a coating formed of at least any one of a UV-curable resin, a thermo-plastic resin, and a heat-curable resin, and
   at least a portion of the UV-curable resin, the thermo-plastic resin, and the heat-curable resin has a flame-resisting property.

5. An optical fiber ribbon wherein the optical fiber ribbon is formed by placing a plurality of optical fibers made of silica-based glass side by side and in parallel to each other and mutually joining the optical fibers, each of the optical fibers, comprising:
   a core including a first core having a diameter "a" of 5.3 μm to 9.4 μm and a second core that surrounds the first core, the second core having a diameter "b" of 13.0 μm to 21.9 μm; and
   a cladding, each of the optical fibers
   having a mode field diameter of 5.5 μm or larger at a wavelength of 1100 nm,
   transmitting light with a wavelength of 1100 nm in a single mode, and
   having a bending loss of 1 dB/turn or smaller at a wavelength of 1100 nm when the optical fiber is bent with a curvature radius of 2 mm,
   wherein the core has a refractive index profile with a relative refractive index difference ($\Delta 1$) of the first core with respect to the cladding being 0.6% or larger, and a relative refractive index difference ($\Delta 2$) of the second core with respect to the cladding being $-0.02\%$ or smaller.

6. The optical fiber ribbon according to claim 5, wherein the optical fiber ribbon has a ribbon coating that is formed of at least any one of a flame-resisting UV-curable resin, a flame-resisting thermo-plastic resin, and a flame-resisting heat-curable resin.

7. An optical interconnection system comprising:
   a light source comprising a Vertical-Cavity Surface-Emitting Laser that has an oscillation wavelength of 1,100 nm to 1,200 nm; and
   a transmission medium comprising an optical fiber, wherein the optical fiber, made of silica-based glass, comprises:
   a core including a first core having a diameter "a" of 5.3 μm to 9.4 μm and a second core that surrounds the first core, the second core having a diameter "b" of 13.0 μm to 21.9 μm; and
   a cladding, the optical fiber
   having a mode field diameter of 5.5 μm or larger at a wavelength of 1100 nm,
   transmitting light with a wavelength of 1100 nm in a single mode, and
   having a bending loss of 1 dB/turn or smaller at a wavelength of 1100 nm when the optical fiber is bent with a curvature radius of 2 mm,
   wherein the core has a refractive index profile with a relative refractive index difference ($\Delta 1$) of the first core with respect to the cladding being 0.6% or larger, and a relative refractive index difference ($\Delta 2$) of the second core with respect to the cladding being $-0.02\%$ or smaller.

8. An optical interconnection system comprising:
   a light source comprising a Vertical-Cavity Surface-Emitting Laser that has an oscillation wavelength of 1,100 nm to 1,200 nm; and
   a transmission medium comprising an optical fiber ribbon that is formed by placing a plurality of optical fibers made of silica-based glass side by side and in parallel to each other and mutually joining the optical fibers, each of the optical fibers, comprising:
   a core including a first core having a diameter "a" of 5.3 μm to 9.4 μm and a second core that surrounds the first core, the second core having a diameter "b" of 13.0 μm to 21.9 μm; and
   a cladding, each of the optical fibers
   having a mode field diameter of 5.5 μm or larger at a wavelength of 1100 nm,
   transmitting light with a wavelength of 1100 nm in a single mode, and
   having a bending loss of 1 dB/turn or smaller at a wavelength of 1100 nm when the optical fiber is bent with a curvature radius of 2 mm,
   wherein the core has a refractive index profile with a relative refractive index difference ($\Delta 1$) of the first core with respect to the cladding being 0.6% or larger, and a relative refractive index difference ($\Delta 2$) of the second core with respect to the cladding being $-0.02\%$ or smaller.

* * * * *